United States Patent
Hazen et al.

(10) Patent No.: US 9,372,851 B2
(45) Date of Patent: Jun. 21, 2016

(54) CREATING A CALENDAR EVENT USING CONTEXT

(71) Applicant: Microsoft Technology Licensing, LLC, Redmond, WA (US)

(72) Inventors: Timothy J. Hazen, Arlington, MA (US); Diamond Bishop, Bellevue, WA (US); Nicolae Duta, Winchester, MA (US); Mohammad Babaeizadeh, Boston, MA (US); Peter Longo, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 14/242,740

(22) Filed: Apr. 1, 2014

(65) Prior Publication Data
US 2015/0278199 A1    Oct. 1, 2015

(51) Int. Cl.
*G06F 17/28* (2006.01)
*G06F 17/27* (2006.01)
*G06Q 10/10* (2012.01)

(52) U.S. Cl.
CPC .............. *G06F 17/28* (2013.01); *G06F 17/274* (2013.01); *G06Q 10/1093* (2013.01)

(58) Field of Classification Search
USPC ................................................. 704/1–10, 257
See application file for complete search history.

(56) References Cited

U.S. PATENT DOCUMENTS

| | | | |
|---|---|---|---|
| 6,567,778 B1 * | 5/2003 | Chao Chang | G06F 17/278 704/257 |
| 7,058,567 B2 * | 6/2006 | Ait-Mokhtar et al. | 704/9 |
| 7,158,980 B2 | 1/2007 | Shen | |
| 7,496,500 B2 | 2/2009 | Reed et al. | |
| 8,423,347 B2 | 4/2013 | Tunning et al. | |
| 2004/0054539 A1 | 3/2004 | Simpson | |
| 2009/0235280 A1 | 9/2009 | Tannier et al. | |
| 2010/0318398 A1 * | 12/2010 | Brun et al. | 704/9 |
| 2011/0035220 A1 | 2/2011 | Opaluch | |
| 2011/0106892 A1 | 5/2011 | Nelson et al. | |
| 2012/0143961 A1 | 6/2012 | Jonsson | |
| 2012/0209860 A1 | 8/2012 | Gummagatta et al. | |
| 2013/0007648 A1 | 1/2013 | Gamon et al. | |
| 2013/0110520 A1 | 5/2013 | Cheyer et al. | |

OTHER PUBLICATIONS

"International Search Report and Written Opinion Issued in PCT Patent Application No. PCT/US2015/023229", Mailed Date: Jun. 25, 2015, 10 Pages.
Second Written Opinion in PCT/US2015/023229, mailed Feb. 29, 2016, 6 pages.

* cited by examiner

*Primary Examiner* — Abul Azad
(74) *Attorney, Agent, or Firm* — Tom Wong; Steven Spellman; Micky Minhas

(57) ABSTRACT

Methods and systems are provided for creating a calendar event using context. A natural language expression including at least one of words, terms, and phrases of text may be received at a calendar event creation module from an application. The calendar event creation module may identify one or more slots in the text of the natural language expression related to the calendar event using a first grammar module and a second grammar module. The one or more slots identified by the first grammar module and the second grammar module that indicate a calendar event may be compared to determine whether there is a match between the one or more identified slots. If a match is found, at least one calendar event using the one or more slots identified by the first grammar module and the second grammar module may be created.

20 Claims, 11 Drawing Sheets

CREATING A CALENDAR EVENT USING CONTEXT

BACKGROUND

People plan events with friends, family, and business associates in many ways including communications using emails, SMS text messages, and Instant Messaging. However, when a person plans and schedules an event, the person is generally required to manually enter the event into her electronic calendar. To do so, the person is required to find the date and time in her calendar and enter details about the event such as duration, subject, and location. Consequently, entering calendar events into electronic calendars, even if planned via emails, SMS text messages, and Instant Messaging, for example, is difficult and inefficient for a user of such applications.

It is with respect to these and other general considerations that embodiments have been made. Also, although relatively specific problems have been discussed, it should be understood that the embodiments should not be limited to solving the specific problems identified in the background.

SUMMARY

In summary, the disclosure generally relates to creating a calendar event. More particularly, the disclosure relates to methods and systems for creating a calendar event using surrounding context from text of a natural language expression. A natural language expression including at least one of words, terms, and phrases of text may be received at a calendar event creation module from an application. The calendar event creation module may detect at least one calendar event from the text of the natural language expression. The at least one calendar event from the text of the natural language expression may be detected by identifying one or more slots in the text of the natural language expression related to the calendar event using a first grammar module and a second grammar module. One or more identified slots by the first grammar module may be compared to one or more identified slots by the second grammar module. When the one or more slots identified by the first grammar module match the one or more identified slots by the second grammar module, at least one calendar event may be created. A proposed calendar event with auto-filled data from the one or more slots identified in the text of the natural language expression may be displayed on a user interface such that a user may save the proposed calendar event in their calendar from the application.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

The present disclosure generally relates to creating a calendar event, e.g., an event object within a calendar application, such as Outlook or some other electronic calendar application, hereinafter calendar. In particular, the present disclosure relates to using two or more context-independent grammars to achieve a context-dependent grammar capability to identify portions in natural language expressions related to a calendar event. For example, natural language expressions may include ambiguous and/or abbreviated phrases, words, and terms that relate to a calendar event. In another example, natural language expressions may have text with missing information. In yet another example, natural language expressions may have text that indicates a past event and/or negated event. Some embodiments therefore label portions in natural language expressions as being a specific type, e.g., subject, location, date, time, etc., where the identification of the types is dependent on surrounding context. In turn, values related to a calendar event may be identified and auto-filled in a proposed calendar event.

The two or more context-independent grammars may include context-free grammars, finite state grammars, regular expression grammars, and the like. As such, implementations of the embodiments disclosed herein may be applied to any type of context-independent grammar such as a context-free grammar, a finite state grammar, a regular expression grammar, and others.

A user of an application (e.g., an email application, a SMS text messaging application, an Instant Messaging, the Internet, and other applications) may plan an event using the application and may desire to automatically and efficiently enter the planned event via the application in their calendar from the application. As such, in embodiments, a calendar event may be created using a computer system. The computer system may include applications for planning an event, a calendar event creations module for processing text of natural language expressions received from the applications to create a calendar event, and a user interface for displaying a proposed calendar event to a user of the computer system such that the user may enter the proposed calendar event in their calendar.

Figure 1:
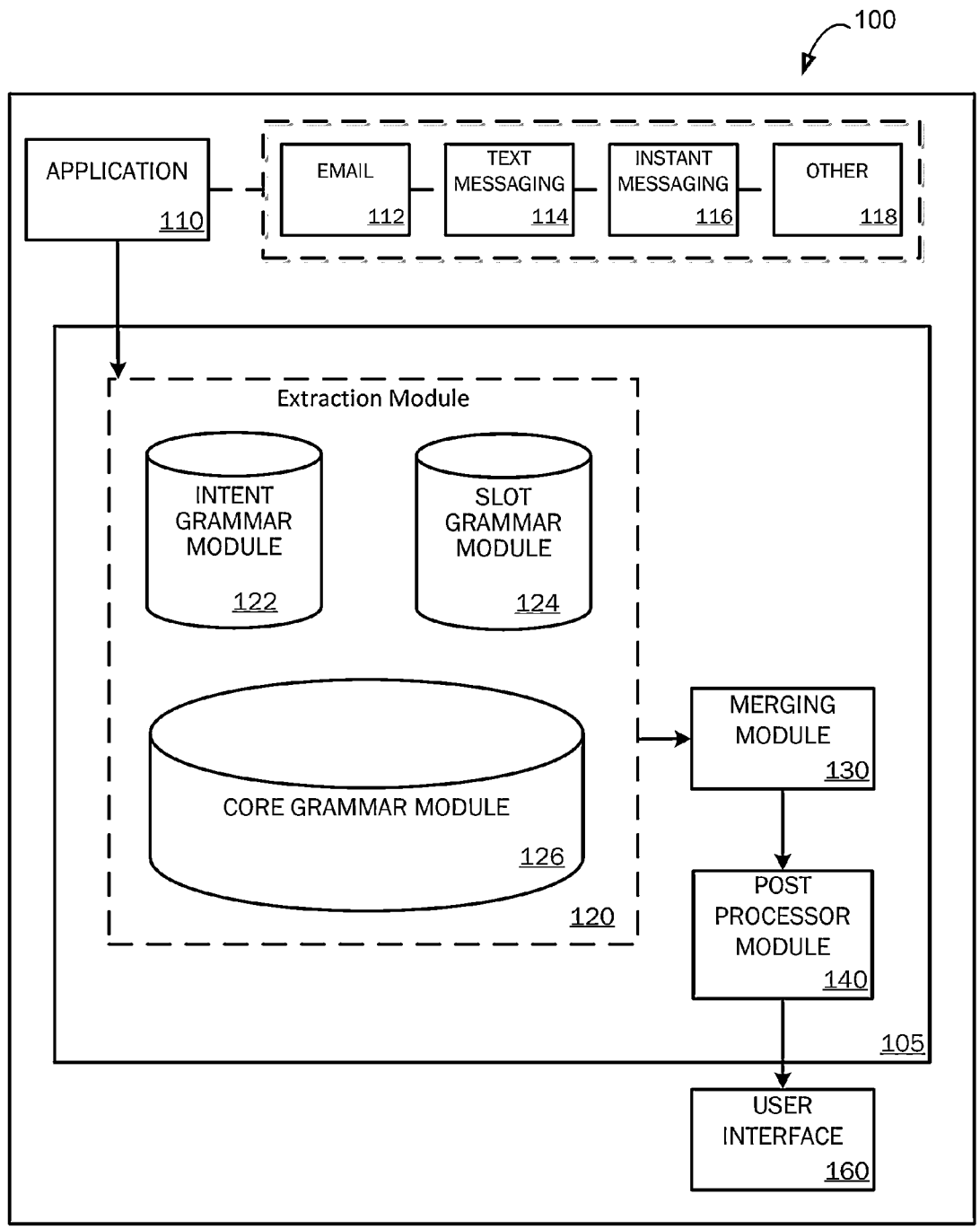
FIG. 1 illustrates an exemplary system for creating a calendar event, according to an example embodiment.

FIG. 1 illustrates an exemplary computer system 100 for creating a calendar event, according to one or more embodiments. The computer system 100 may be part of any device having a calendar application such as a mobile telephone, a smart phone, wearable computer (such as a smart watch or other wearable devices), a tablet computer, a laptop computer, a personal computer, and the like. In some embodiments, the computer system 100 includes an application 110, a calendar event creation module 105, and a user interface 160. The application 110 may include any application suitable for facilitating communication between devices such as an email application 112, a text message application 114 (e.g., SMS, MMS), an Instant Messaging application 116 (e.g., Windows Messenger), and others 118. The applications suitable for facilitating communication between devices may be implemented on any computing device capable of supporting such applications, such as a mobile telephone, a smart phone, wearable computer, a tablet personal computer, a laptop computer, a personal computer, and the like.

The user interface 160 may be any user interface suitable for facilitating interaction between a user and an operating environment of a computer system. For example, the user interface 160 may facilitate creating a natural language expression in an application 110 for subsequent processing by the calendar event creation module 105. In another example, the user interface 160 may display a proposed calendar event to a user such that the user may add the proposed calendar event to the user's calendar.

The calendar event creation module 105 may be part of an operating environment of the computer system 100. For example, the calendar event creation module 105 is configured to process text of natural language expressions to create a calendar event. In this regard, in embodiments, the calendar event creation module 105 includes an extraction module 120, a merging module 130, and a post processing module 140. The extraction module 120 may include an intent grammar module 122, a slot grammar module 124, and a core grammar module 126. The intent grammar module 122 and the slot grammar module 124 may be constructed based on the core grammar module 126. The core grammar module 126 may be based on an analysis of a large collection of natural language expressions (e.g., context-independent grammars). For example, the core grammar module 126 may include defined rules for natural language expressions such as rules for handling abbreviations and short form words. One skilled in the art would recognize the basics of the core grammar module 126 and the corresponding defined rules of the core grammar module 126. The intent grammar module 122 and the slot grammar module 124 include defined rules associated with the one or more slots related to calendar events. The intent grammar module 122 may include defined rules for handling text within which date and time slots may be detected and linked to other slots related to calendar events (e.g., location and subject slots). The intent grammar module 122 may handle text that indicates past events and text that indicates the negations of events. The slot grammar module 124 includes defined rules for tagging types of slots, determining where the slots are located in the text, and transducing date/time values in to a standardized form. Both the intent grammar module 122 and the slot grammar module 124 include defined rules for handling ambiguous text, as will be described in more detail below.

In embodiments, the extraction module 120 is configured to receive one or more natural language expressions. The natural language expressions may include at least one of words, terms, and phrases of text. Natural language expressions may be received at extraction module 120 from the application 110 (e.g., email application 112, text message application 114, Instant Messaging application 116, and others 118). For example, when a user enters a natural language expression in the application 110, the natural language expression may be transmitted to the extraction module 120 via any suitable communication medium. For example, as illustrated in FIG. 1, the application 110 is part of computer system 100. In this example, the communication medium may be a computer bus (not shown). However, in other embodiments, the application 110 may be part of a different computer system (not shown) in communication with computer system 100. In this example, the communication medium may be a wireless network.

When the extraction module 120 receives the one or more natural language expressions from application 110, the extraction module 120 detects at least one calendar event from text of the natural language expression. In one embodiment, the extraction module 120 may detect at least one calendar event from the text by identifying one or more slots in the text related to a calendar event. The one or more slots in the text may include at least one of a date, time, date/time, subject, location, duration, and availability query, to name a few. The date slot may include any words, terms, and/or phrases that are associated with a date. In one example, a date may be a particular day, month, or year at which some event happened or will happen. The time slot may include any words, terms, and/or phrases that are associated with a time. In one example, a time may be the time relative to the date at which some event happened or will happen. The date/time slot may include words, terms, and/or phrases that include both a date and a time. The subject slot may include any words, terms, and/or phrases that indicate the presence of an event. The location slot may include words, terms, and/or phrases associated with a location (e.g., a place where an event has happened or will happen). The duration slot may include words, terms, and/or phrases that indicate a period of time. The availability query slot may include words, terms, and phrases that are associated with questions relating to availability.

The one or more slots in the text related to a calendar event may be identified based at least in part on a derived context from the text. The context may be derived from the text by utilizing at least the intent grammar module 122 and the slot grammar module 124 of the extraction module 120. In one example, the intent grammar module 122 and the slot grammar module 124 may be constructed to describe the slots of interest for calendar events (e.g., time, date, time/date, location, subject, duration, and availability query). For example, the intent grammar module 122 may include defined rules for context surrounding/supporting ambiguous words, terms, and phrases, which will be described in more detail below. In another example, the slot grammar module 124 may include defined rules for context surrounding/supporting slots indicating a calendar event that negates the slots indicating a calendar event, which will be described in more detail below.

The process of creating a calendar event may include executing a parsing algorithm. The parsing algorithm may be any algorithm suitable to search for a set of things (e.g., rules, text, and the like). For example, the parsing algorithm may search at least the intent grammar module 122 and/or the slot grammar module 124 to identify one or more slots in the text related to a calendar event. The parsing algorithm may include any analysis associated with searching for a set of things such as identifying one or more slots in text related to a calendar event, tagging one or more types of slots identified in the text, handling ambiguous text, and determining where a slot is located in the text, for example. In one example, the parsing algorithm may be a context-free parser, which parses context-free language. The parsing algorithm may also be a finite state parser, which parses formal language (e.g., a set of strings). As such, searching and/or parsing at least one of the intent grammar module 122 and the slot grammar module 124 for the words, terms, and phrases in the natural language expression includes executing the parsing algorithm. For example, the defined rules of the intent grammar module 122 and the slot grammar module 124 may be parsed and/or searched and/or tested to find a match between a word, term, and/or phrase and a defined rule. If a match is found, the word, term, and/or phrase that match a defined rule may be tagged as the type of slot associated with the defined rule. For example, if text includes the word "tomorrow", and a rule defining the date slot includes "tomorrow", the word "tomorrow" in the text may be tagged as a date type slot.

The parsing algorithm may be executed to search and/or parse the intent grammar module 122 and the slot grammar module 124 to find matches between defined rules. For example, if the word "tomorrow" in the text is tagged as a date value based on a defined rule for the date slot (e.g., DateItem rule), and the DateItem rule is part of the rule defined for a calendar event (e.g., a CalEvent rule), the parsing algorithm may search the CalEvent rule for the DateItem rule. In this example, if the CalEvent rule is defined to include the DateItem rule, the word "tomorrow" (since a match was found in the DateItem rule) may be tagged as a potential calendar event. As such, when a date and/or time slot is identified in the text, a potential calendar event may be detected. In the example described above, a rule defined for a date slot was described. As can be appreciated, the intent grammar module 122 and the slot grammar module 124 may include, but are not limited to, defined rules associated with time, date/time, location, subject, duration, and availability query slots. As such, the parsing algorithm may be executed to search and/or parse the intent grammar module 122 and the slot grammar module 124 to identify time, date/time, location, subject, duration, and availability query slots, in addition to date slots, in the text. In turn, one or more values associated with the identified slots, in addition to date and/or time values, (e.g., subject and location values) may be auto-filled in a proposed calendar event when creating the proposed calendar event, which will be described in more detail below.

As discussed above, the intent grammar module 122 may be constructed based on a core grammar module 126. As such, the intent grammar module 122 may include defined rules for identifying the negation of an identified calendar event and identifying past calendar events. In one example, in some cases, even when a date and/or time slot has been identified to indicate a proposed calendar event in the text, the intent grammar module 122 may define rules indicating a negation of the calendar event. For example, in the text, "I can't go to the movies on Saturday," "Saturday" may be identified as a date slot and "movies" may be identified as a subject slot. As such, this text may be identified as a potential calendar event. However, the rules defined for the negation of a calendar event may include the word, "can't". In this example, the rule defined for the negation of a calendar event may take precedence over the rule that indicates the text includes a calendar event, and the text may be tagged as "other".

In another example, the intent grammar module 122 may include defined rules for identifying a past calendar event. For example, in the text, "The movie on Saturday was fun," "Saturday" may be identified as a date slot and "movie" may be identified as a subject slot. As such, this text may be identified as a potential calendar event. However, the rules defined for a past calendar event may include the word "was". As discussed above, when the parsing algorithm identifies both a calendar event and a negation of a calendar event and/or a past calendar event in the text, the parsing algorithm may prefer the negation or past calendar event rule over the calendar event rule such that the text may not ultimately be tagged as a calendar event and/or may be tagged as "other".

In yet another example, the intent grammar module 122 may include defined rules for context surrounding/supporting ambiguous words, terms, and phrases. For example, the character strings "sat" and "sun" could correspond to abbreviations for "Saturday" and "Sunday" (as in the phrase "on sat eve or sun morn") or could be examples of the words "sat" and "sun" (as in the phrase "sat in the sun"). In this example, the intent grammar module 122 may only identify "sat" and "sun" as valid date slots when other supporting context is present (e.g., "eve" or "morn" in the example). As such, the text "sat" and "sun" are part of a defined rule in the intent grammar module 122 that is assumed to not be a date unless there is supporting context that it is date.

When a potential calendar event is detected by the intent grammar module 122, the slot grammar module 124 may be executed. In embodiments, the intent grammar module 122 and the slot grammar module 124 may be executed simultaneously. In yet other embodiments, the slot grammar module 124 may be executed before the intent grammar module 122. As discussed above, the slot grammar module 124 may be constructed based on a core grammar module 126. For example, the slot grammar module 124 may define rules for tagging types of slots and locating the tagged slots in the text. For example, in the text, "pick up the kids from school tomorrow evening," the parsing algorithm may identify and tag "tomorrow evening" as a date/time slot type and "school" as a location slot type. In this regard, the slot grammar module 124 may have a rule defined for determining the location of "tomorrow evening" and "school" in the expression "pick up the kids from school tomorrow evening." For example, the expression "pick up the kids from school tomorrow evening" spans 45 characters. The parsing algorithm may determine that the word "school" starts at character 22 and spans 6 characters and that the phrase "tomorrow evening" starts at character 29 and spans 16 characters.

Determining the location of the one or more identified and tagged slot types in the text may facilitate finding exceptions in the text that negate an otherwise identified slot type related to calendar event, which will be discussed in more detail below. Determining the location, in the text, of the one or more identified and tagged slot types relating to the calendar event may facilitate auto-filling one or more values related to a calendar event when creating a proposed calendar event, which will be discussed in more detail below. Additionally, determining the location of the one or more identified and tagged slot types relating to the calendar event may indicate where to present a visual indicator associated with the one or more identified slots, which will also be described in more detail below.

In another example, the slot grammar module 124 may define rules for transducing one or more identified values in to a standardized canonical form. For example, the date/time expression "fri@7p" may be transduced to "Friday 7:00 PM." In another example, the date/time expression "3/7 at 7 pm" may be transduced to "March $7^{th}$ 7:00 PM." As such, the parsing algorithm may search the slot grammar module 124 to transduce time and date expressions into a standardized surface form in preparation for normalization into formal date/time expressions. In some embodiments, the final normalized form may follow the ISO 8601 date and time specifications, although not necessary.

In yet another example, the slot grammar module 124 may define rules for context surrounding/supporting identified slot types indicating a calendar event that negates the slot types indicating a calendar event. Such rules may be defined such that if one slot spans more characters than another slot (and the slots overlap, for example), the slot that spans more characters will be tagged as its corresponding slot type. For example, in the text, "meeting on the first floor", the parsing algorithm may identify "on the first" as a date slot based on a defined rule in the intent grammar module 122 that indicates "on the first" is a date type. However, the slot grammar module 124 may include defined rules for surrounding/supporting context that negates such a finding such as identifying, "on the first floor," as a location type slot. As such, in this example, the slot grammar module 124 will tag "on the first floor," as a location slot, rather than tagging "on the first," as a date slot because "on the first floor" spans more characters than "on the first." In this regard, the rule may provide surrounding/supporting context to the phrase "on the first" that was previously identified as a date such that it is determined that "on the first" is in fact not a date.

As discussed above, the calendar event creation module 105 may include a merging module 130. The merging module 130 may be configured to merge results from both the intent grammar module 122 and the slot grammar module 124 into a single output structure. The results may include the identified and/or tagged slot types from each of the intent grammar module 122 and the slot grammar module 124 after both the intent grammar module 122 and the slot grammar module 124 receive and process the text from the natural language expression. As such, the results are located in one place (e.g., in a single structure) to be processed by the post processor module 140.

After the merging module 130 merges results from both the intent grammar module 122 and the slot grammar module 124 into a single output structure, the post processor module 140 may be executed. The post processor module 140 is configured to perform additional processing required to create an actual calendar event for storing in a user's calendar. The post processor module 140 is used to create an actual calendar event and determine any remaining information that may be needed for creating the actual calendar event. The post processor module 140 is used to resolve conflicts and/or anticipate or make an inference as to what potential data should be used to determine remaining information. For instance, if a date and time slot has been identified in the results from both the intent grammar module 122 and the slot grammar module 124, the post processor module 140 will evaluate the identified slots to create one coherent calendar event. In one example, the post processor module 140 may be configured to compare the results from both the intent grammar module 122 and the slot grammar module 124 to determine whether the one or more slots identified by the intent grammar module 122 and the one or more slots identified by the slot grammar module 124 match. For example, in the phrase, "meeting on the first floor," if the intent grammar module 122 identifies "on the first" as a date slot and the slot grammar module 124 identifies, "on the first floor," as a location slot, the post processing module 140 will determine that the slots identified by the intent grammar module 122 do not match the slots identified by the slot grammar module 124. As such, the post processing module 140 will not detect a calendar event from the phrase, "meeting on the first floor". In this regard, a context-dependent result is achieved.

In another example, the post processor module 140 may link one or more identified slots of the same type together when more than one slot of the same type is identified in the text. For example, in the expression, "Let's meet tomorrow in Waltham for breakfast at 7 at McDonalds," the post processor module 140 may link "Waltham" and "McDonalds" into a single location slot and link "tomorrow" and "7" as a date/time slot based on the full context in the text. In one example, the post processor module 140 may include a defined rule that simply combines two identified location slots into one location slot. In another example, the post processor module 140 may have a set of rules that define when to link two locations found in one calendar event. In this example, the rule may be defined such that if a first location is preceded by the word "in" and a second location is preceded by the word "at" and only one calendar event is identified in the text, the first and second location should be linked. In this regard, when a calendar event is created, the location slot may be auto-filled to include McDonald's in Waltham and the date and time slots may be auto-filled accordingly.

In yet another example of post processing, the post processor module 140 may infer information in the one or more identified slots based on context derived from the text. The post processor module 140 may include a set of rules having a collection of common words, terms, and/or phrases for inferring information. Using the example described above, "breakfast at 7" does not indicate whether the time value is AM or PM. As such, the identified time slot, "7" may require inferring information to identify "7" as "7 AM" or "7 PM". Making an inference as to whether "7" refers to AM or PM may be made using the set of rules in the post processor module 140. In one example, the set of rules may include time information. As such, when an AM/PM decision needs to be made, a set of rules associated with time information may be tested. In one example, a rule may be "if the subject contains 'breakfast' then the time is AM". In this example, it is inferred that 7 implies 7 AM. If a rule is not found when making an AM/PM decision, the post processor module 140 may pick AM/PM based on default conditions. For example, 8:00-11:59 may be defined as AM by default and 12-7:59 may be defined as PM by default. In another example, in the text, "let's meet after work at 8 tomorrow," an inference can be made that 8 implies 8 PM not 8 AM because the phrase "after work" indicates it's 8 PM based on the collection of time information rules in the post processor module 140.

In yet another example of post processing, the post processor module 140 may be configured to forward an identified date slot across multiple calendar events with different time values. For example, in the text, "Saturday the movie starts at 8 pm so let's get dinner at 6 pm," it may be inferred that the date slot "Saturday" refers to both the "movie" calendar event and "dinner" calendar event. As described above, with regard to inferring information in an identified slot based on context, the post processor module 140 may include a set of rules for forwarding an identified date slot across multiple calendar events with different time slots.

Figure 2:
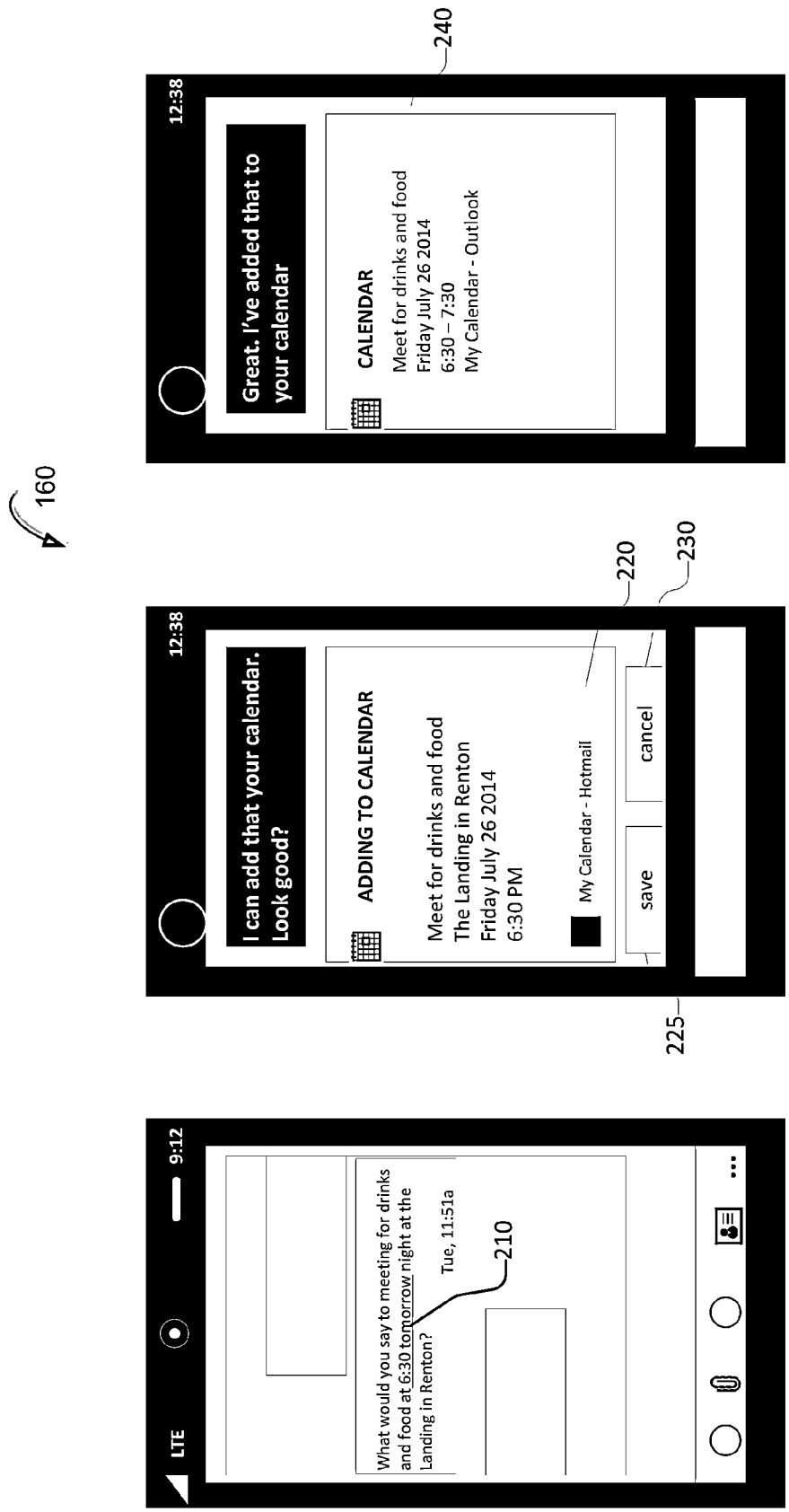
FIG. 2 illustrates a user interface including a visual indicator and a proposed calendar event, according to an example embodiment.

FIG. 2 illustrates a user interface 160 including a visual indicator 210 and a proposed calendar event 220. The visual indicator 210 may be associated with at least one identified calendar event. After any required post processing has been completed, the visual indicator 210 associated with the at least one identified calendar event may be presented on the user interface 160. In one embodiment, the visual indicator 210 may be associated with the date and/or time slot. As shown in FIG. 2, the text presented on the user interface 160 has "6:30 tomorrow night" underlined. As such, the visual indicator 210 is associated with the date/time slot identified in the text. In this example, the visual indicator 210 is shown by underlining the associated value. The visual indicator 210 may be any visual indicator suitable for indicating that a calendar event may be created from the text. For example, the visual indicator 210 may include solid underlining, highlighting, dotted underlining, bolding, italicizing, and the like. In one embodiment, the visual indicator 210 may include a hyperlink. In this regard, a user may invoke the hyperlink by tapping and/or clicking, for example, on the visual indicator 210.

When a user invokes the visual indicator 210, a proposed calendar event 220 with auto-filled data from the one or more identified slots identified in the text may be displayed. In the example illustrated in FIG. 2, the one or more identified slots include a subject, location, date and time. The subject is "meet for drinks and food", the location is "The Landing in Renton", the date is "Friday, Jul. 26, 2014", and the time is "6:30 PM". A user may invoke a save button 225 or a cancel button 230. If the save button 225 is invoked, the proposed calendar event is added to the user's calendar 240.

Figure 3:
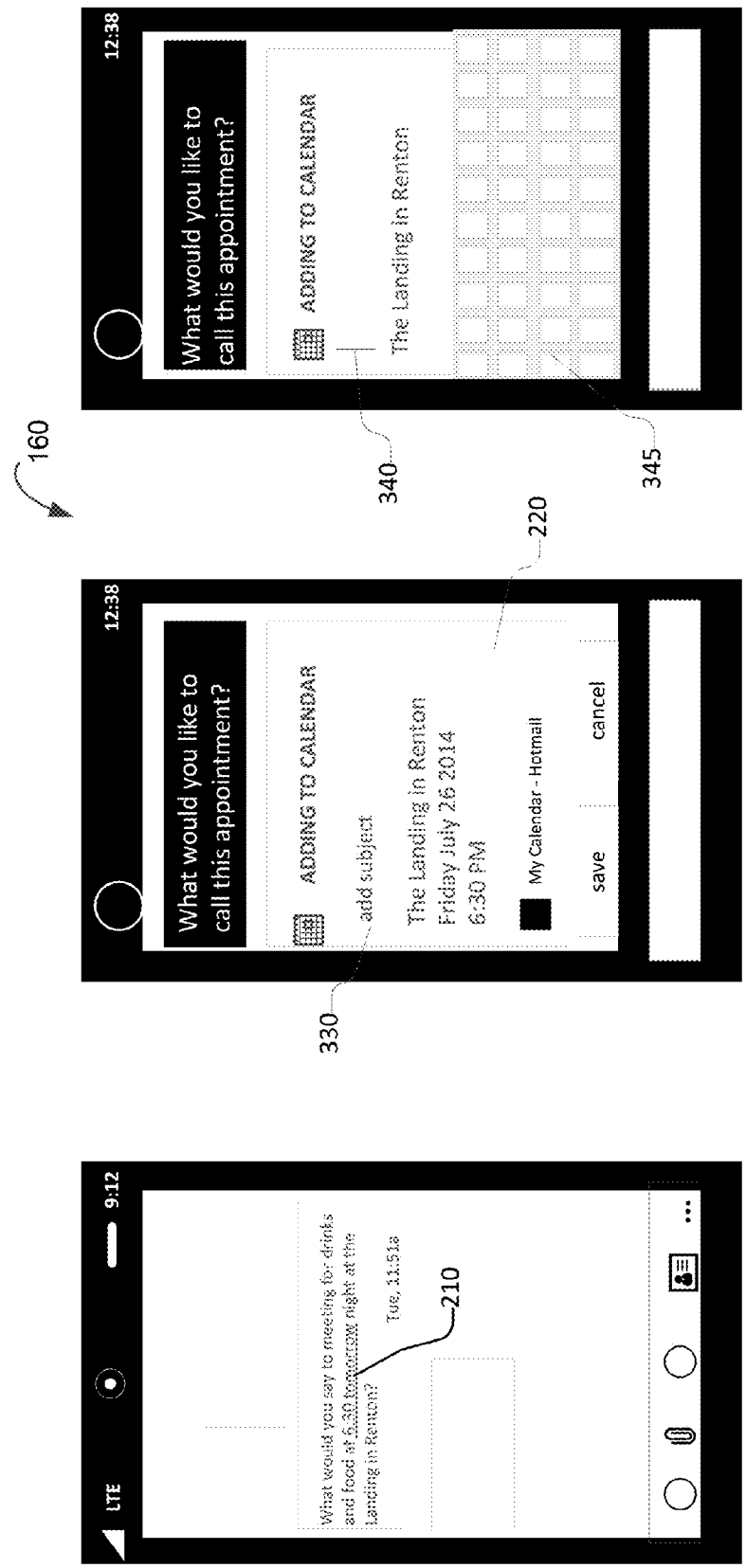
FIG. 3 illustrates a user interface including an option to edit a proposed calendar event, according to an example embodiment.

FIG. 3 illustrates a user interface 160 including an option 330 to edit a proposed calendar event 220. The user interface 160 includes the visual indicator 210 as discussed with reference to FIG. 2. As such, as discussed above, when a user invokes the visual indicator 210, a proposed calendar event 220 with auto-filled data from the one or more identified slots identified in the text may be displayed. A user is presented with the option 330 to edit the subject field in the proposed calendar event 220. As such, a user may select the option 330 for editing/adding a subject slot to the subject field in the calendar event 220. A user may enter text 340 using a keypad 345 on the user interface 160 such that a subject is added to the proposed calendar event 220.

As described above with reference to FIG. 2, time, date, subject, and location slots were auto-filled and displayed in the proposed calendar event 220. In this regard, a time, date, subject, and location were identified in the text of the natural language expression. In contrast, in FIG. 3, time, date, and location slots were auto-filled and displayed in the proposed calendar event 220, but the subject field did not have an auto-filled value. In this regard, a time, date, and location were identified in the text of the natural language expression. As shown in FIGS. 2 and 3, the natural language expression in FIG. 2 includes a subject slot, "meeting for drinks and food", and the natural language expression in FIG. 3 does not include a subject slot. As such, in FIG. 3, the user had the option 330 to add/edit the subject field in the proposed calendar event 220. It is appreciated that, even in the scenario illustrated in FIG. 2, a user may edit one or more fields in the proposed calendar event 220.

Figure 4:
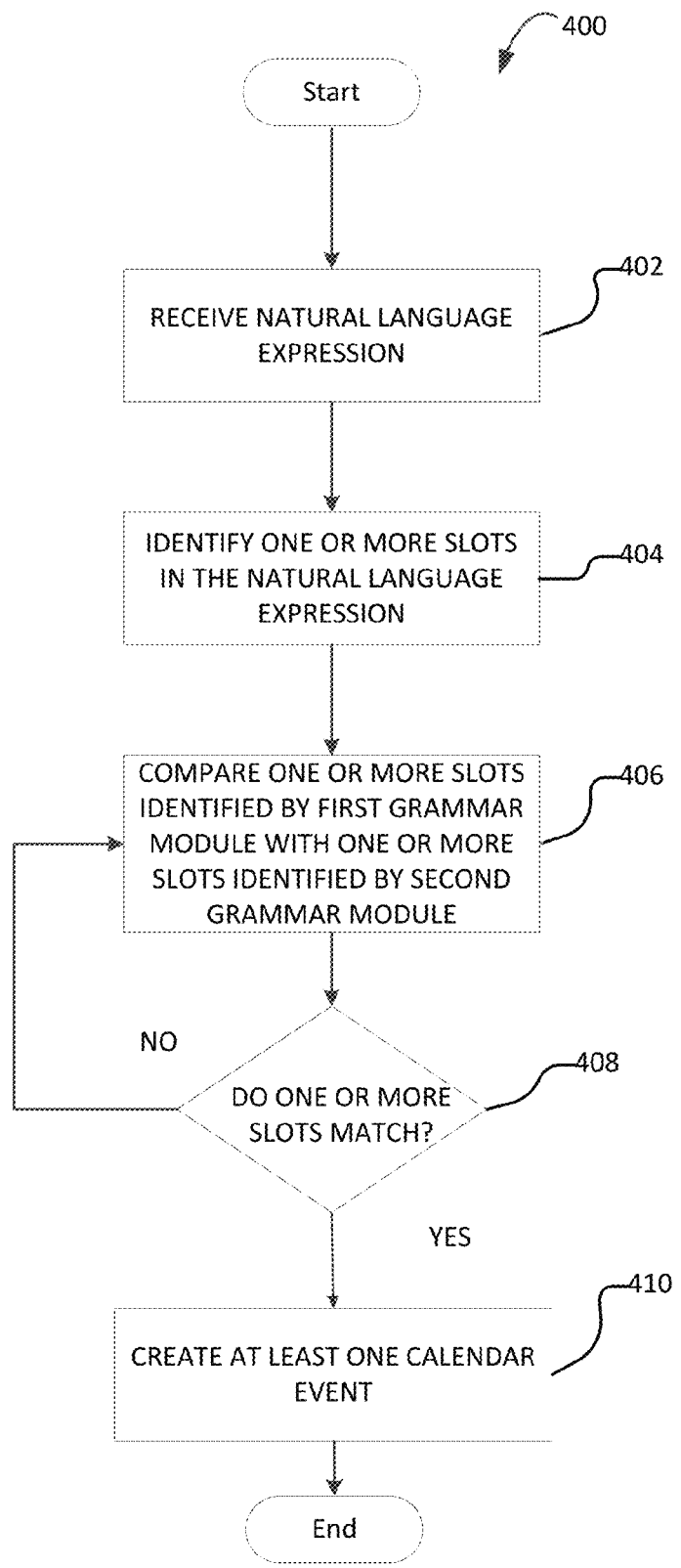
FIG. 4 illustrates an exemplary method for creating a calendar event, according to an example embodiment.

FIG. 4 illustrates a method for creating a calendar event according to one or more embodiments of the present disclosure. Method 400 begins at operation 402 where a natural language expression is received. For example, the natural language expression may be received by the extraction module from any application suitable for facilitating communication between devices such as an email application, a text message application (e.g., SMS, MMS), an Instant Messaging application (e.g., Windows Messenger), and the like. The applications suitable for facilitating communication between devices may be implemented on any computing device capable of supporting such applications, such as a mobile telephone, a smart phone, wearable computer (such as a smart watch), a tablet personal computer, a laptop computer, and the like. In one example, the natural language expression may include at least one of words, terms, and phrases of text.

When a natural language expression is received at the extraction module, flow proceeds to operation 404 where one or more slots in the text of the natural language expression that indicate a calendar event are identified using a first grammar module and a second grammar module. The one or more slots in the text may include at least one of a date, time, date/time, subject, location, duration, and availability query, to name a few.

When one or more slots in the text of the natural language expression that indicate a calendar event are identified using a first grammar module and a second grammar module, flow proceeds to operation 406 where one or more slots identified by the first grammar module that indicate a calendar event are compared with one or more slots identified by the second grammar module that indicate a calendar event to determine whether the one or more slots identified by the first grammar module and the one or more slots identified by the second grammar module match. For example, if the one or more slots identified by the first grammar module include a date, time and location type slot and the one or more slots identified by the second grammar module include a date, time and location type slot, the detected slots identified from the first grammar module are compared with the detected slots identified from the second grammar module to determine if the two sets of slots constitute a valid match for a calendar event.

At operation 408, it is determined whether the one or more slots identified by the first grammar module match the one or more slots identified by the second grammar module. If the one or more slots identified by the first grammar module do not match the one or more slots identified by the second grammar module, flow proceeds back to operation 406, where more slots may be compared. If the one or more slots identified by the first grammar module do match the one or more slots identified by the second grammar module, flow proceeds to operation 410, where at least one calendar event is created using the one or more slots identified by the first grammar module and the second grammar module. For example, if the one or more slots that match are date, time, location, and subject slots, a calendar event is created with the values of these slots auto-filled in the calendar event.

Figure 5:
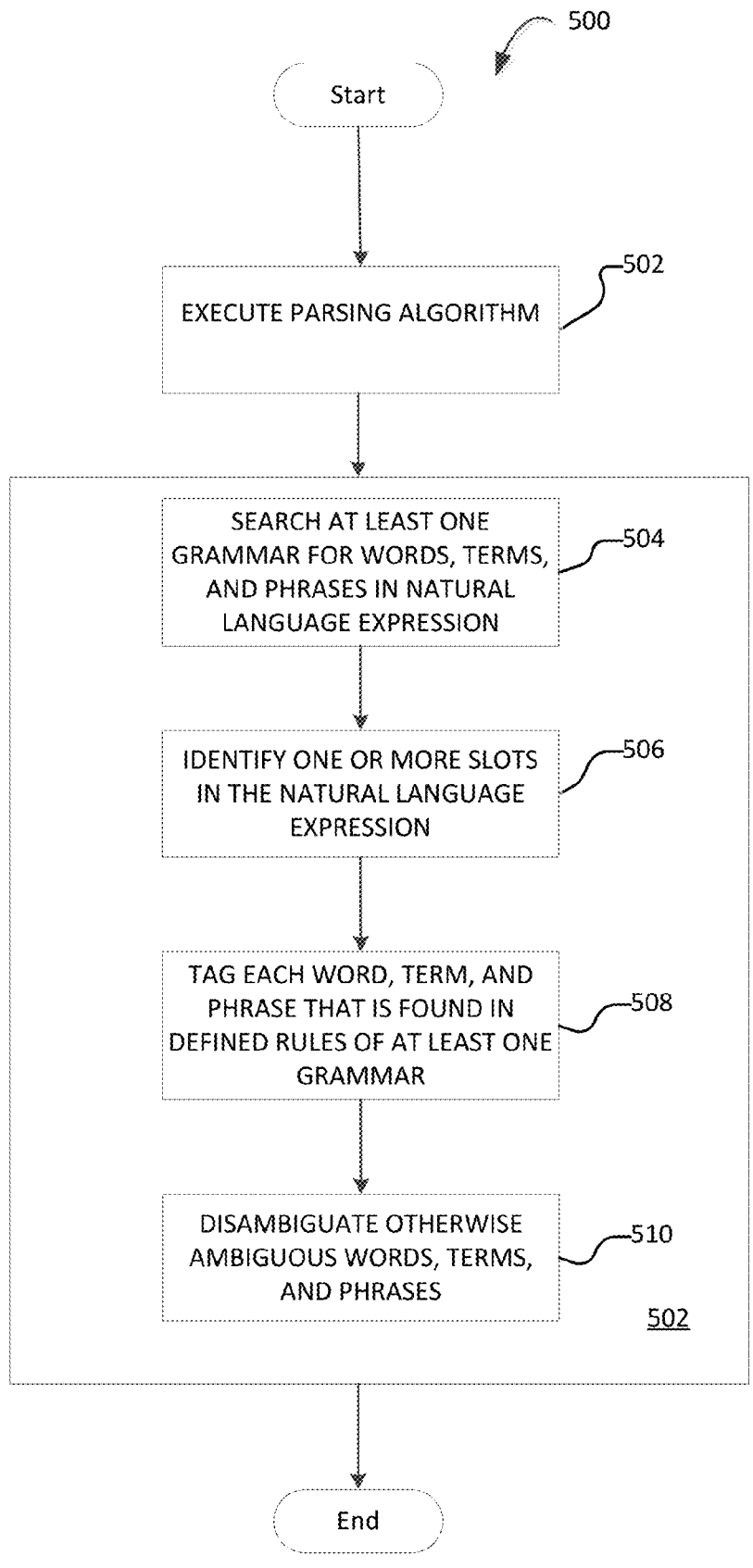
FIG. 5 illustrates an exemplary method for detecting at least one calendar event from a natural language expression, according to an example embodiment.

FIG. 5 illustrates a method 500 for detecting at least one calendar event from text of a natural language expression, according to one or more embodiments of the present disclosure. In one embodiment, a method 500 begins at operation 502 in which a parsing algorithm is executed. The parsing algorithm may be any algorithm suitable to search for a set of things (e.g., rules, text, and the like). For example, the parsing algorithm may search at least the intent grammar module and/or the slot grammar module to identify one or more slots in the text related to a calendar event. The parsing algorithm may include any analysis associated with searching for a set of things such as identifying one or more slots in text related to a calendar event, tagging one or more types of slots identified in the text, handling ambiguous text, and determining where a slot is located in the text, for example.

When the parsing algorithm is executed, multiple operations may be performed. At operation 504 at least one of the intent grammar module and the slot grammar module is searched and/or parsed for the words, terms, and phrases in the natural language expression. In one example, the intent grammar module may be searched and/or parsed before the slot grammar module to identify one or more slots related to a calendar event. If no slots related to a calendar event are identified, the intent grammar module is skipped. If one or more slots related to a calendar event are identified, the slot grammar module is searched and/or parsed to identify the locations of the one or more identified slots, tag one or more identified slots, and identify the one or more identified slots that are not valid based on context surrounding the one or more identified slots related to a calendar event.

At operation 506, one or more slots in the text of the natural language expression that indicate a calendar event are identified. The one or more slots in the text related to a calendar event may be identified based at least in part on a derived context from the text. The context may be derived from the text by utilizing at least the intent grammar module and the slot grammar module of the extraction module. In one example, the intent grammar module and the slot grammar module may be constructed to describe the slots of interest for calendar events (e.g., time, date, time/date, location, subject, duration, and availability query). For example, the intent grammar module may include defined rules for context surrounding/supporting ambiguous words, terms, and phrases. In another example, the slot grammar module may include defined rules for context surrounding/supporting slots indicating a calendar event that negates the slots indicating a calendar event.

Method 500 continues to operation 508 in which each word, term, and phrase in the natural language expression that is found/identified in the defined rules is tagged as the slot type associated with the defined rule where the word, term, or phrase is found. For example, if a natural language expression includes the word "tomorrow", and a rule defining the date slot includes "tomorrow", the word "tomorrow" in the natural language expression may be tagged as a date slot.

At operation 510, otherwise ambiguous words, terms, and phrases are disambiguated. For example, using the "on the first floor" example described above, the phrase "on the first" is part of a rule that is assumed to be a date (e.g., by the intent grammar module) unless specific surrounding context exists to indicate that it is not a date. In this example, the slot grammar module includes defined rules for the context that would negate the phrase being a date phrase. In a second example, using the "on sat eve or sun morn" example described above, the character strings "sat" and "sun" are part of a defined rule that is assumed to not be a date unless there is supporting context to indicate that it is date (e.g., a ruled defined in the intent grammar module indicating that it is a date). In this example, the slot grammar module may have a defined rule indicating that "sat" and "sun" are possible dates, but the decision on whether or not "sat" and "sun" are dates may be determined by defined rules in the intent grammar module that require certain types of the supporting context to confirm it is a date.

Figure 6:
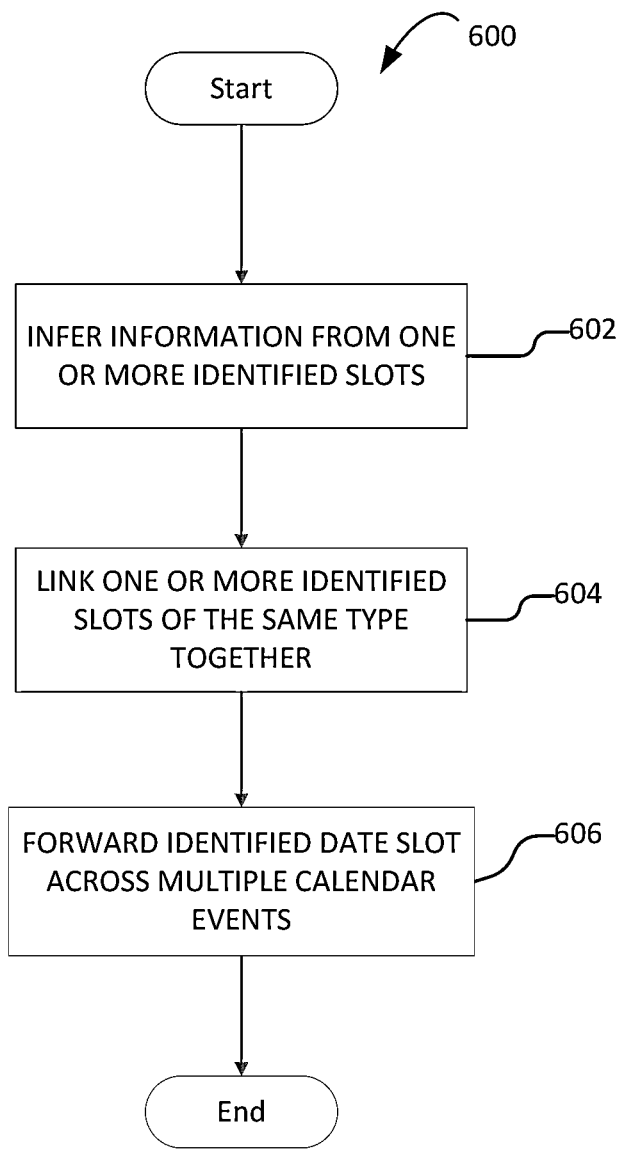
FIG. 6 illustrates an exemplary method for processing a natural language expression identified as a proposed calendar event, according to an example embodiment.

FIG. 6 illustrates a method 600 for processing text of a natural language expression identified as a proposed calendar event, according to one or more embodiments of the present disclosure. In one embodiment, a method 600 begins at operation 602 in which information in the one or more identified slots is inferred based on context derived from the text of the natural language expression. For example, the post processor module may include a set of rules having a collection of common words, terms, and/or phrases for determining missing information. In one example, "breakfast at 7" does not indicate whether the time value is AM or PM. As such, the identified time slot, "7" has missing information. A determination as to whether 7 refers to AM or PM may be made using the set of rules in the post processor module. In one example, the set of rules may include time information. As such, when an AM/PM decision needs to be made, a set of rules associated with time information may be tested. In one example, a rule may be "if the subject contains 'breakfast' then the time is AM". In this example, it is determined that 7 implies 7 AM.

Next, at operation 604, one or more identified slots of the same type are linked together when more than one slot of the same type is identified in the text of the natural language expression. For example, in the expression, "Let's meet tomorrow in Waltham for breakfast at 7 at McDonalds," the post processor 140 may link "Waltham" and "McDonalds" into a single location slot and link "tomorrow" and "7" as a date/time slot based on the full context in the text. For example, the post processor module 140 may have a set of rules that define when to link two locations found in one calendar event. In this example, the rule may be defined such that if a first location is preceded by the word "in" and a second location is preceded by the word "at" and only one calendar event is identified in the text, the first and second location should be linked. In this regard, when a calendar event is created, the location slot may be auto-filled to include McDonald's in Waltham and the date and time slots may be auto-filled accordingly.

At operation 606, an identified date slot may be forwarded across multiple calendar events with different time slots. For example, in the text, "Saturday the movie starts at 8 pm so let's get dinner at 6 pm," it may be inferred that the date slot "Saturday" refers to both the "movie" calendar event and "dinner" calendar event. The post processor module may include a set of defined rules for forwarding an identified date slot across multiple calendar events with different time slots.

Figure 7:
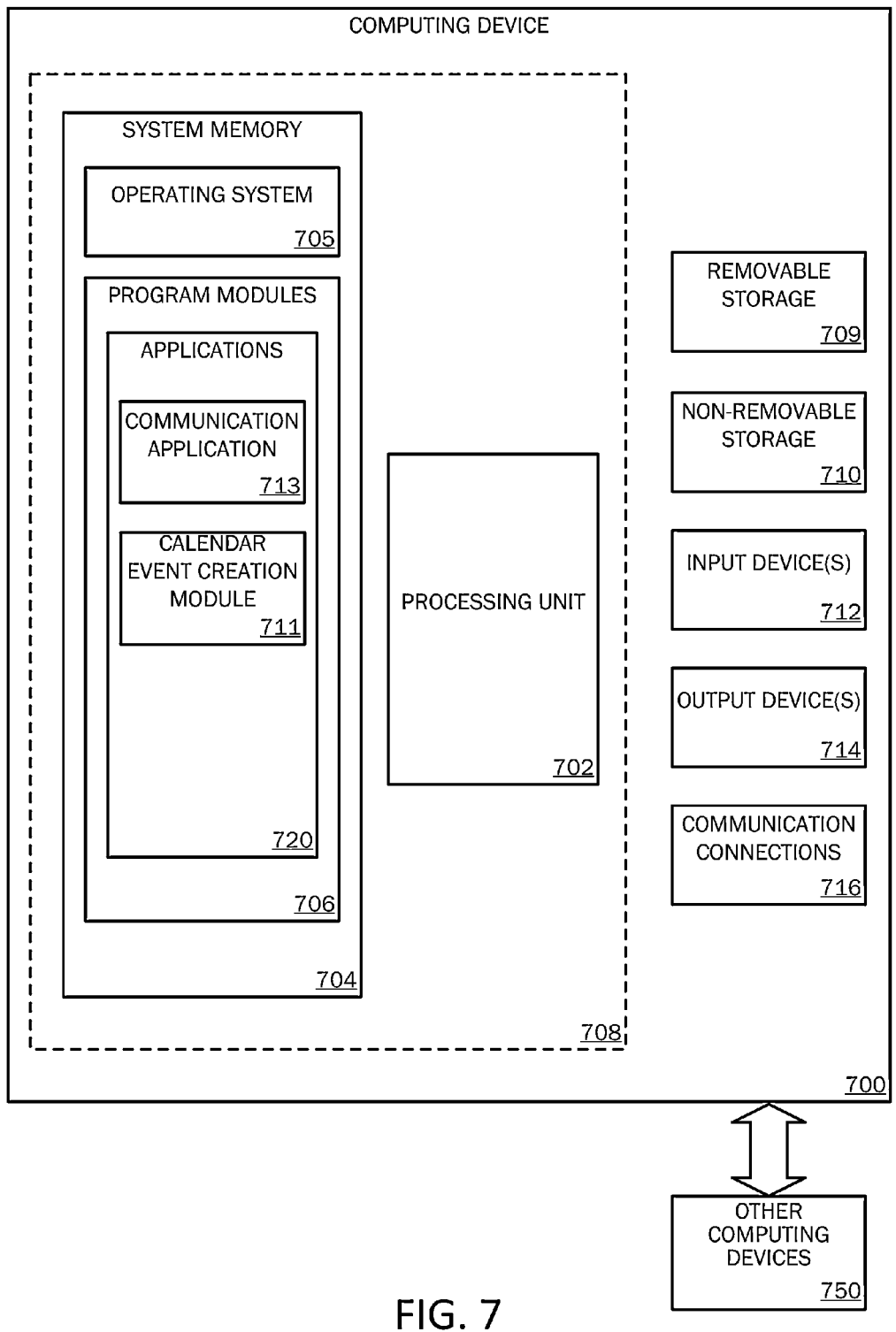
FIG. 7 is a block diagram illustrating example physical components of a computing device with which embodiments of the disclosure may be practiced.

FIGS. 7-10 and the associated descriptions provide a discussion of a variety of operating environments in which embodiments of the disclosure may be practiced. However, the devices and systems illustrated and discussed with respect to FIGS. 7-10 are for purposes of example and illustration and are not limiting of a vast number of computing device configurations that may be utilized for practicing embodiments of the disclosure, described herein FIG. 7 is a block diagram illustrating physical components (e.g., hardware) of a computing device 700 with which embodiments of the disclosure may be practiced. The computing device components described below may have computer executable instructions for a communication application 713, e.g., of a client and/or computer executable instructions for calendar event creation module 711, e.g., of a client, that can be executed to employ the methods 400 through 600 disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as creating a calendar event in regards to FIGS. 1-3 and, in particular, communication application 713 or calendar event creation module 711. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., calendar event creation module 711 or communication application 713) may perform processes including, but not limited to, the embodiment, as described herein. Other program modules that may be used in accordance with embodiments of the present disclosure, and in particular to generate screen content, may include electronic mail and contacts applications, word processing applications, spreadsheet applications, database applications, slide presentation applications, drawing, messaging applications, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
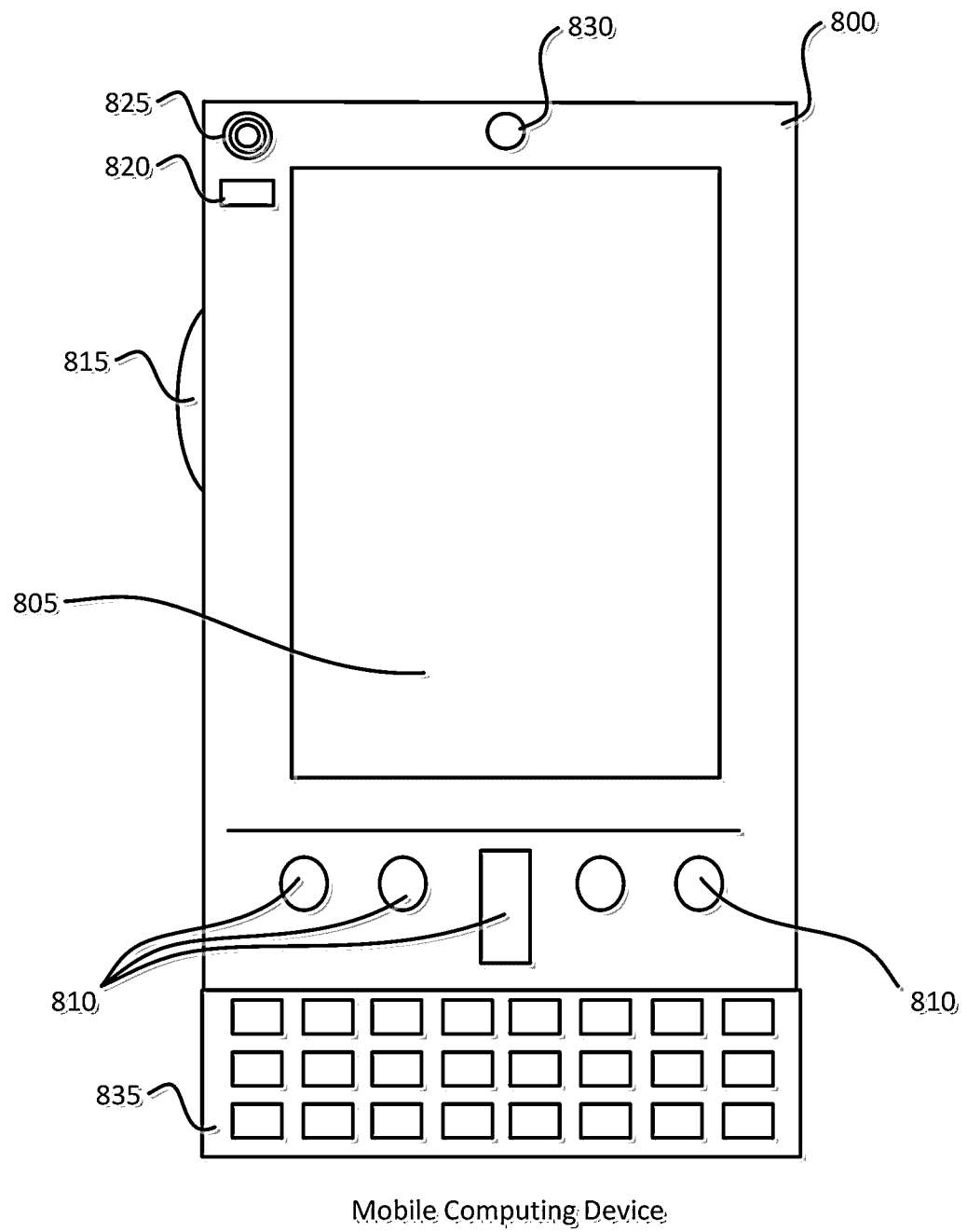
FIGS. 8A and 8B are simplified block diagrams of a mobile computing device with which embodiments of the present disclosure may be practiced.
Figure 8B:
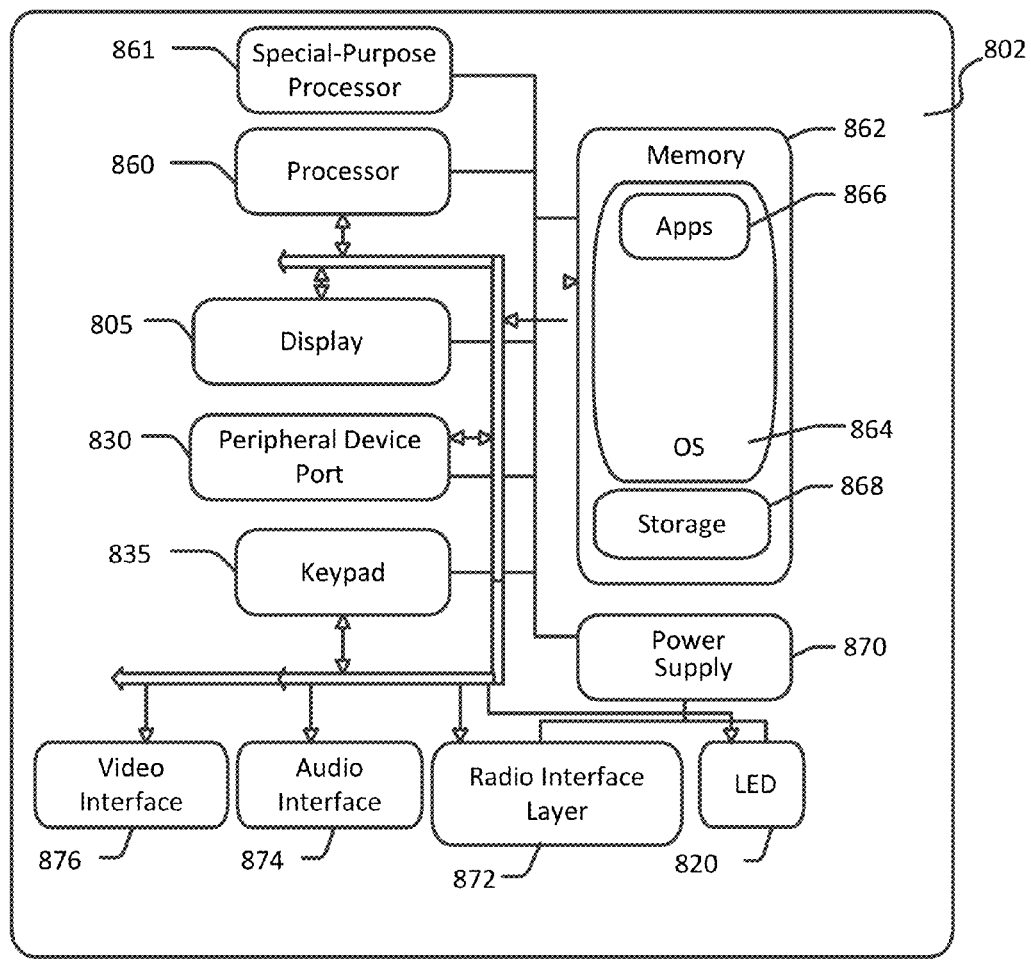

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some embodiments, the client may be a mobile computing device. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (e.g., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions to create a calendar event as described herein (e.g., and/or optionally calendar event creation module 711).

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Figure 9:
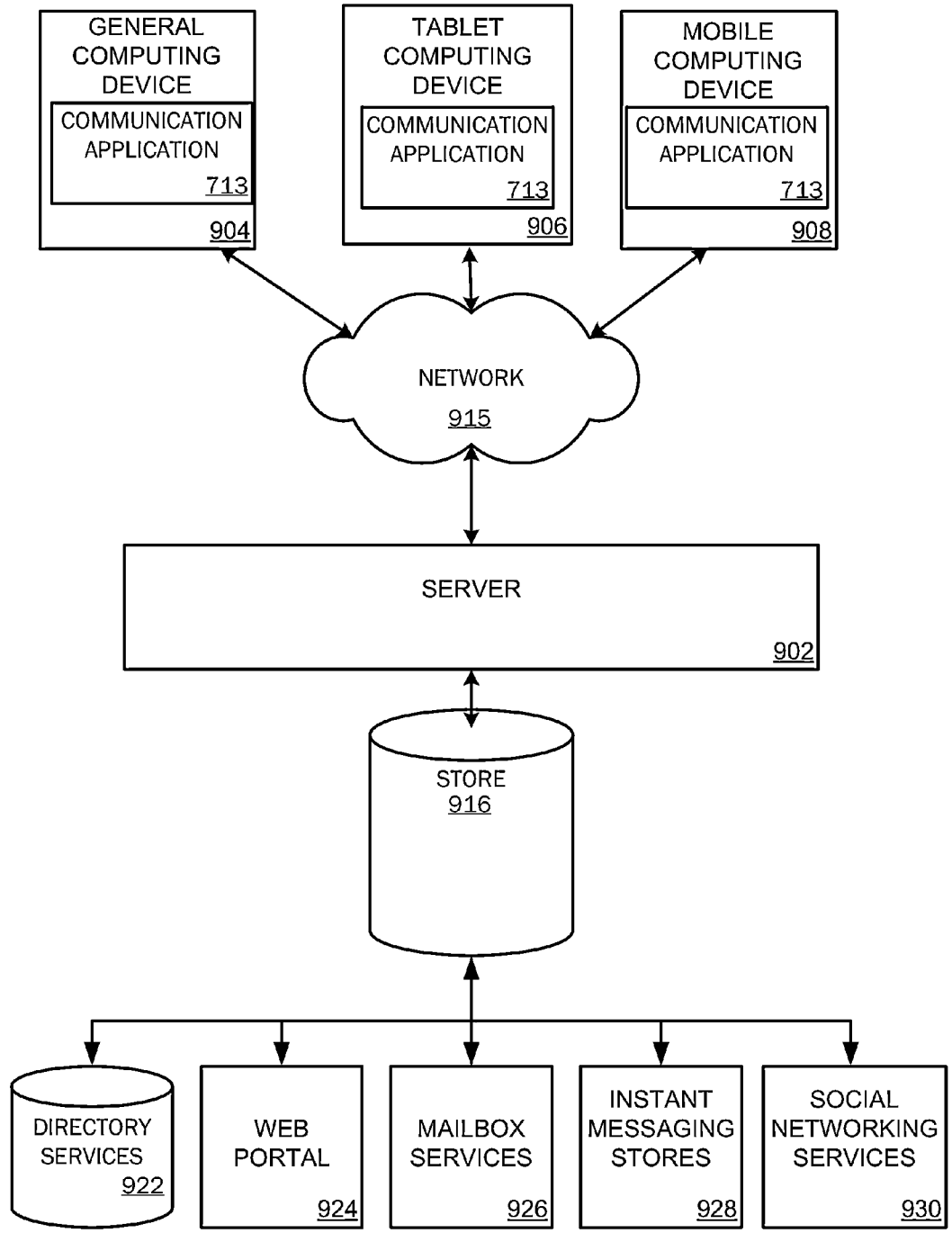
FIG. 9 is a simplified block diagram of a distributed computing system in which embodiments of the present disclosure may be practiced.

FIG. 9 illustrates one embodiment of the architecture of a system for processing data received at a computing system from a remote source, such as a computing device 904, tablet 906, or mobile device 908, as described above. Content displayed at server device 902 may be stored in different communication channels or other storage types. For example, various documents may be stored using a directory service 922, a web portal 924, a mailbox service 926, an instant messaging store 928, or a social networking site 930. The communication application 713 may be employed by a client who communicates with server 902. The server 902 may provide data to and from a client computing device such as a personal computer 904, a tablet computing device 906 and/or a mobile computing device 908 (e.g., a smart phone) through a network 915. By way of example, the computer system described above with respect to FIGS. 1-3 may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
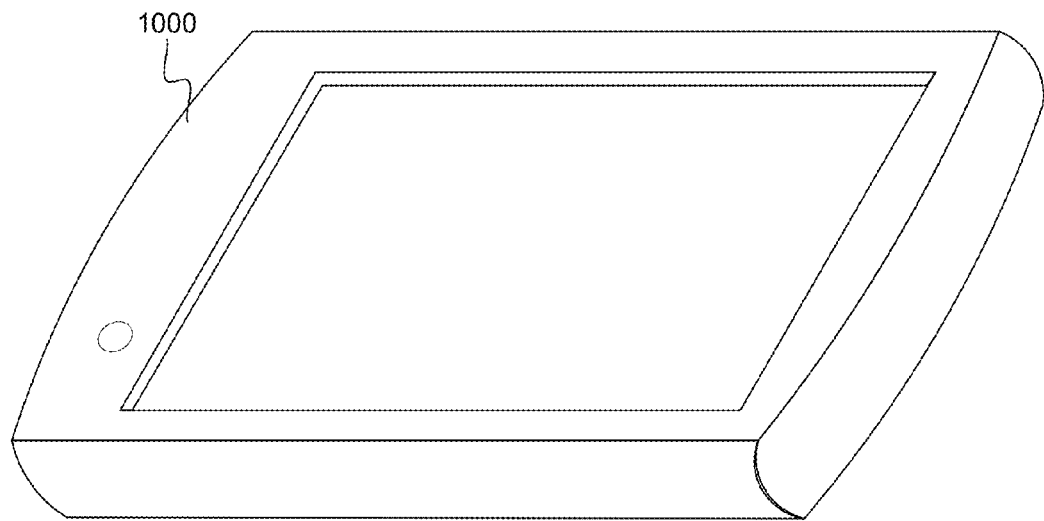
FIG. 10 illustrates a tablet computing device for executing one or more embodiments of the present disclosure.

FIG. 10 illustrates an exemplary tablet computing device 1000 that may execute one or more embodiments disclosed herein. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure as claimed in any way. The embodiments, examples, and details provided in this application are considered sufficient to convey possession and enable others to make and use the best mode of claimed disclosure. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

The invention claimed is:

1. A method for creating a calendar event, the method comprising:
    receiving a natural language expression, wherein the natural language expression includes at least one of words, terms, and phrases of text;
    identifying one or more slots in the text of the natural language expression that indicate a calendar event using a first grammar module and a second grammar module;
    comparing the one or more slots identified by the first grammar module that indicate a calendar event with the one or more slots identified by the second grammar module that indicate a calendar event to determine whether the one or more slots identified by the first grammar module and the one or more slots identified by the second grammar module match; and
    when the one or more slots identified by the first grammar module and the one or more slots identified by the second grammar module match, creating at least one calendar event using the one or more slots identified by the first grammar module and the second grammar module.

2. The method of claim 1, wherein the one or more slots related to a calendar event include at least one of a date, time, date/time, subject, duration and location type slot.

3. The method of claim 1, wherein the first grammar module and the second grammar module are context-independent grammar modules, wherein the first grammar module is an intent grammar module, and wherein the second grammar module is a slot grammar module.

4. The method of claim 1, wherein identifying one or more slots in the text of the natural language expression comprises executing a parsing algorithm.

5. The method of claim 2, wherein the first grammar module and the second grammar module have defined rules associated with the one or more types of slots.

6. The method of claim 5, wherein the defined rules associated with the one or more types of slots include rules for context surrounding ambiguous words, terms, and phrases in the text.

7. The method of claim 5, wherein the defined rules associated with the one or more types of slots include rules for context surrounding identified slots indicating a calendar event that negates the slots indicating a calendar event.

8. The method of claim 5, wherein the defined rules associated with the one or more types of slots include rules that indicate a past event.

9. The method of claim 5, wherein the defined rules associated with the one or more types of slots include rules that indicate a negation of an event.

10. The method of claim 5, wherein identifying one or more slots in the natural language expression further comprises tagging each word, term, and phrase in the natural language expression that is found in the defined rules as the slot type associated with the defined rule where the word, term, or phrase is found.

11. The method of claim 2, further comprising inferring information from the one or more identified slots based on context derived from the text of the natural language expression.

12. The method of claim 2, further comprising linking one or more identified slots of the same type together when more than one slot of the same type is identified in the text of the natural language expression.

13. The method of claim 1, further comprising:
    presenting, on a display, a visual indicator associated with the at least one calendar event;
    receiving an indication that the visual indicator has been invoked; and
    displaying a proposed calendar event with auto-filled data from the one of more slots identified in the text of the natural language expression.

14. A computer storage device, having computer-executable instructions that, when executed by at least one processor, perform a method for creating a calendar event, the method comprising:
    receiving a natural language expression, wherein the natural language expression includes at least one of words, terms, and phrases of text;
    identifying one or more slots in the text of the natural language expression that indicate a calendar event using a first grammar module and a second grammar module;
    comparing the one or more slots identified by the first grammar module that indicate a calendar event with the one or more slots identified by the second grammar module that indicate a calendar event to determine whether the one or more slots identified by the first grammar module and the one or more slots identified by the second grammar module match; and
    when the one or more slots identified by the first grammar module and the one or more slots identified by the second grammar module match, creating at least one calendar event using the one or more slots identified by the first grammar module and the second grammar module.

15. The computer storage device of claim 14, wherein the one or more slots related to a calendar event include at least one of a date, time, date/time, subject, duration and location type slot.

16. The method of claim 15, wherein the first grammar module and the second grammar module have defined rules associated with the one or more types of slots.

17. The method of claim 15, wherein the defined rules associated with the one or more types of slots include rules for context surrounding ambiguous words, terms, and phrases in the text.

18. The method of claim 15, wherein the defined rules associated with the one or more types of slots include rules for context surrounding identified slots indicating a calendar event that negates the slots indicating a calendar event.

19. The computer storage device of claim 15, the method further comprising inferring information from the one or more identified slots based on context derived from the text of the natural language expression.

20. A system comprising:
   at least one processor; and
   memory encoding computer executable instructions that, when executed by at least one processor, perform a method for creating a calendar event, the method comprising:
   receiving a natural language expression, wherein the natural language expression includes at least one of words, terms, and phrases of text;
   identifying one or more slots in the text of the natural language expression that indicate a calendar event using a first grammar module and a second grammar module;
   comparing the one or more slots identified by the first grammar module that indicate a calendar event with the one or more slots identified by the second grammar module that indicate a calendar event to determine whether the one or more slots identified by the first grammar module and the one or more slots identified by the second grammar module match;
   when the one or more slots identified by the first grammar module and the one or more slots identified by the second grammar module match, creating at least one calendar event using the one or more slots identified by the first grammar module and the second grammar module;
   presenting, on a display, a visual indicator associated with the at least one calendar event;
   receiving an indication that the visual indicator has been invoked; and
   displaying a proposed calendar event with auto-filled data from the one of more slots identified in the text of the natural language expression.

* * * * *